(12) United States Patent
Ganesh

(10) Patent No.: US 10,382,297 B2
(45) Date of Patent: Aug. 13, 2019

(54) SYSTEM AND METHOD FOR MONITORING MULTI-DOMAIN NETWORK USING LAYERED VISUALIZATION

(71) Applicant: B. Anbu Ganesh, Chennai (IN)

(72) Inventor: B. Anbu Ganesh, Chennai (IN)

( * ) Notice: Subject to any disclaimer, the term of this patent is extended or adjusted under 35 U.S.C. 154(b) by 219 days.

(21) Appl. No.: 15/453,801

(22) Filed: Mar. 8, 2017

(65) Prior Publication Data

US 2017/0288991 A1 Oct. 5, 2017

(30) Foreign Application Priority Data

Mar. 29, 2016 (IN) .............................. 201641010721

(51) Int. Cl.
*G06F 15/173* (2006.01)
*H04L 12/26* (2006.01)
*H04L 12/24* (2006.01)

(52) U.S. Cl.
CPC .......... *H04L 43/045* (2013.01); *H04L 41/069* (2013.01); *H04L 41/0631* (2013.01); *H04L 43/0817* (2013.01); *H04L 41/142* (2013.01)

(58) Field of Classification Search
CPC ............... H04L 43/045; H04L 43/0817; H04L 41/0631; H04L 41/069; H04L 41/142
USPC ....................................................... 709/224
See application file for complete search history.

(56) References Cited

U.S. PATENT DOCUMENTS

| 5,864,662 | A | 1/1999 | Brownmiller et al. | |
|---|---|---|---|---|
| 5,946,373 | A | 8/1999 | Harris | |
| 7,131,037 | B1 * | 10/2006 | LeFaive | H04L 41/0631 714/46 |
| 7,197,546 | B1 | 3/2007 | Bagga et al. | |
| 7,269,185 | B2 | 9/2007 | Kirkby et al. | |
| 7,441,154 | B2 | 10/2008 | Klotz et al. | |
| 8,132,180 | B2 * | 3/2012 | Agarwal | G06F 11/008 709/223 |
| 8,737,235 | B2 | 5/2014 | Nandy et al. | |
| 8,761,029 | B2 * | 6/2014 | Ge | G06F 11/0709 370/216 |

(Continued)

FOREIGN PATENT DOCUMENTS

| EP | 2469761 B1 | 4/2014 |
|---|---|---|
| EP | 2890151 B1 | 6/2016 |

*Primary Examiner* — Frantz B Jean
(74) *Attorney, Agent, or Firm* — Innovation Capital Law Group, LLP; Vic Lin

(57) ABSTRACT

The present invention relates to a system and method for monitoring multi-domain network using end-to-end layered visualization to identify exact root cause of network element to prevent degradation in the network performance is disclosed. The system comprises of data collection module, correlation module, mapping module and management server. The data collection module collects performance data, alarm data, configuration logs and signalling traces from one or more network elements through the management server to draw connectivity across one or more layers. The correlation module correlates the collected performance data, alarm data and configuration logs at regular intervals in order to isolate the root cause of the issue identified. This correlated data of all the network elements are superimposed with layered visualization and mapped by the mapping module and thereby identify the exact root cause of network element causing degradation in the network performance.

9 Claims, 4 Drawing Sheets

(56) References Cited

U.S. PATENT DOCUMENTS

| | | | |
|---|---|---|---|
| 9,729,414 B1* | 8/2017 | Oliveira | H04L 43/0805 |
| 2003/0235280 A1 | 12/2003 | Shafie-Khorasani et al. | |
| 2009/0109860 A1* | 4/2009 | Cinato | H04L 41/046 370/242 |
| 2010/0091676 A1* | 4/2010 | Moran | H04L 47/10 370/252 |
| 2015/0128056 A1 | 5/2015 | Rizzi et al. | |

* cited by examiner

SYSTEM AND METHOD FOR MONITORING MULTI-DOMAIN NETWORK USING LAYERED VISUALIZATION

FIELD OF INVENTION

The present invention relates to system and method for monitoring multi-domain network, particularly to system and method for monitoring multi-domain network using end-to-end layered visualization, which isolates/categorizes and identifies the exact root cause of network element to prevent degradation in the network performance. More particularly, the present invention relates to system and method for monitoring multi-domain network, which provides visualization highlighting the exact root cause of the network issue causing degradation in the network element. Further, the present invention reduces Mean Time to Repair (MTTR) in case of outage in the network.

BACKGROUND OF INVENTION

Generally, telecommunication network consists of devices belonging to different domains (CS, PS, IP, Radio and Transmission) and vendors in a multi-layered environment. A multi domain network architecture consists of several devices such as Core Routers, Core Network Elements (MME, PGW, SGW, SGSN, GGSN, MSC, MGW, HLR etc.), Radio Nodes (RNC, BSC, eNodeB etc.), Transmission devices (Optical Fibre, Microwave) belonging to different layers (Layer 1, Layer 2, Layer 3 and Layer 7). In a telecommunication network, the above nodes may belong to different vendors. All the nodes will be interconnected to each other. The nodes are managed by Operation Supports System (OSS). The OSS plays a role in carrying out functions such as network configuration, service provisioning and network inventory management. Outage in any of the above nodes of the OSS of the network may have an impact to the connected nodes belonging to other domain, for example a fibre cut in a transmission will impact performance metrics (KPIs) belonging to one or more Radio nodes (BSC, RNC) connected to it and further it will have an impact in the core devices connected to it. To identify the exact root cause in a particular domain is always a challenging task.

EP2890151 discloses a method for efficient multilayer optical networking, comprising a controller which receives traffic packets from a device. Each one of said traffic packets including a VLAN tag indicates a destination of a second device. A first monitoring unit analyzes the bytes content of said received packets during a period of time and reporting said analysis to said controller.

U.S. Pat. No. 7,269,185 discloses a communications network which has multiple resource-allocation layers and incorporates a management structure for allocating resources to allocate resources requested by the first layer of said layers from the second of said layers. At the first layer, the management structure provides an indication to the second layer of the required resources that are to be allocated from the second layer. The second layer automatically offers the required resource together with a condition for use of those resources.

U.S. Pat. No. 7,197,546 discloses a network management system for a multi-layer network having multiple architectural or technological domains including an inter-domain configuration manager arranged between a set of one or more network service management applications and a set of network element domain managers, each of the domain managers being associated with a particular domain of the multi-layer network.

U.S. Pat. No. 8,737,235 discloses a real-time network-analysis system that comprises a network appliance and a plurality of management devices. The network appliance continuously monitors an object network and synthesizes a current network image comprising contemporaneous indicators of connectivity, occupancy, and performance of the object network. A management-client device may gain access to the network image for timely control and for use in producing long-term network-evolution plans.

U.S. Pat. No. 5,946,373 discloses a fault detection system comprising means for sensing faults occurring in particular components of the network and generating fault alarm data there from; the alarm data propagated downstream through the network for collection at a fault management end point; a database that characterizes the topology of the network, located at the fault management end point, and containing entries that define the routing of circuits and trunks through the network.

U.S. Pat. No. 7,441,154 discloses a method for determining errors and metrics in a computer network. The method includes positioning an analyzer in communication with the network, capturing a data trace of the network with the analyzer, determining a network device topology from a first processing of the data trace, building user layer protocols using a second processing of the data trace and the determined device topology, determining errors in the network device topology using protocol experts applied to the user layer protocols in conjunction with the determined device topology.

US20150128056 discloses a system for providing visualization and analysis of performance data. The system may comprise one or more processors communicatively coupled to a mobile communications network. The one or more processors may be configured to provide a user interface at a mobile device for a user to view network performance data associated with the mobile communications network. The one or more processors may further be configured provide one or more user-selectable options to a user at a mobile device to view the network performance data.

EP2469761 discloses a network monitoring system probe, which is coupled to network interfaces and captures data packets. A monitoring system processor identifies messages specific to S1-MME interfaces and identifies GUMMEI parameters in the S1-MME interface messages. The monitoring system creates MME node entries in a network topology list, each of the MME nodes corresponding to a unique GUMMEI value.

However, in the prior art layered approaches it's not possible to isolate and identify the exact layer in which the outage has occurred and also to see its impact across other connected domain.

U.S. Pat. No. 5,864,662 discloses a system and method for determining a root cause of error activity in a network is described herein. Root cause analysis includes the correlation between reported error activity for path, line and section entities along a provisioned channel in the network. Root causes can also be identified based upon the correlation of simultaneous error activity on various signal transport levels. Finally, root cause analysis can correlate error activity along various path entities. However, data is collected only from element manager acting as the passage leading to isolating a group of nodes having the impact. Hence it's not possible to isolate and identify the exact layer in which the outage has occurred and also to see its impact across other connected domain.

US20030235280 discloses an inter domain congestion management architecture having the ability to analyze and correlate congestion problems across multiple domains, provide integrated network maps, tabular displays and/or reports and allow network managers, in appropriate circumstances, to navigate to a domain to implement corrective actions.

However, the inter domain congestion management architecture cannot provide the solution to find the exact location of the problem as it does not consider the functional wise responsibilities of each network elements.

Accordingly, there exists a need for system and method for monitoring multi-domain network in real time using end-to-end layered visualization, which isolates/categorizes and identifies exact root cause of network element to prevent degradation in the network performance.

OBJECTS OF INVENTION

One or more of the problems of the conventional prior art may be overcome by various embodiments of the system and method of the present invention.

It is the primary object of the present invention to provide system and method for monitoring multi-domain network in real time using end-to-end layered visualization, which isolates/categorizes and identifies the exact root cause of network element to prevent degradation in the network performance.

It is another object of the present invention to provide system and method for monitoring multi-domain network, which provides visualization highlighting the exact root cause of the network issue causing degradation in the network element.

It is another object of the present invention to provide system and method for monitoring multi-domain network, which generates visualization of different domains in a telecommunication network across layers and identifies the exact root cause of network element using the layered approach based on configuration, performance and alarm data collected across multiple domains.

It is another object of the present invention to provide system and method for monitoring multi-domain network using layered visualization, which visualizes the problem with layer wise connected network element status, so that end user can easily identify the root cause of the problem.

It is another object of the present invention, wherein the performance data, alarm data and configuration logs are collected in real time from the OSS and network elements using Network Management System (NMS), File Transfer Protocol (FTP), Secure Shell File Transfer Protocol (SFTP), Simple Network Management Protocol (SNMP) and Telnet.

It is another object of the present invention, wherein the layered visualization covers layers ranging across Core, IP, Radio, Optical and Microwave Transmission.

It is another object of the present invention to provide system and method that reduces Mean Time to Repair (MTTR) in case of outage in the network.

SUMMARY OF INVENTION

Thus according to the basic aspect of the present invention there is provided a system for monitoring multi-domain network in real time using layered visualization comprising of:

Data collection module;
Correlation module;
Mapping module; and
Management server,
wherein the data collection module collects performance data, alarm data, configuration logs and signaling traces from one or more network elements through the management server to draw connectivity across one or more layers,
wherein the correlation module correlates the collected performance data, alarm data and configuration logs at regular intervals in order to isolate the root cause of the issue identified, and
Wherein the categorized performance data, alarm data and configuration logs of all the network elements are superimposed with layered visualization and mapped by the mapping module and thereby identify exact root cause of network element causing degradation in the network performance.

It is another aspect of the present invention, wherein the correlation module categorizes the event occurrences based on the network behavior at each instance to the network's general functionality of the network elements to isolate the root cause of the issue identified thereby reducing Mean Time to Repair (MTTR) in case of outage in the network.

A further aspect of the present invention is directed to provide a method for monitoring multi-domain network in real time comprising steps of:

Collecting performance data, alarm data and configuration logs from network elements to draw connectivity across one or more layers to perform correlative analysis;
categorizing the collected performance data, alarm data and configuration logs based on the network element functionalities, alarm severity and network element configuration parameters respectively on every event occurrences; and
mapping the categorized performance data, alarm data and configuration logs of all the network elements which are superimposed with layered visualization, thereby identifying exact root cause of network element causing degradation in the network performance,
Wherein the configuration data collected is scanned at regular intervals to find the differences in the result thus having the network structure updated,
wherein inter domain correlation of the categorized performance data, alarm data and configuration logs is used to identify exact root cause of the network element causing degradation in the network performance, and
wherein the inter domain correlation categorizes the event occurrences based on the network behavior at each instance to the network's general functionality of the network elements to isolate the root cause of the issue identified thereby reducing Mean Time to Repair (MTTR) in case of outage in the network.

It is another aspect of the present invention, wherein the configuration logs collected analyzes hardware components across various network elements.

It is another aspect of the present invention, wherein the performance data includes measurements having statistical count on every action encountered in the network.

It is another aspect of the present invention, wherein the alarm data includes fault event occurrences within the network.

It is another aspect of the present invention, wherein the performance data, alarm data and configuration logs are collected in real time from the OSS and network elements using Network Management System (NMS), File Transfer Protocol (FTP), Secure Shell File Transfer Protocol (SFTP), Simple Network Management Protocol (SNMP) and Telnet.

It is another aspect of the present invention, wherein the visualization is achieved for the performance degradation observed in the network element in first layer, which impacts the connected node performance in second layer, third layer and seventh layer.

It is another aspect of the present invention, wherein the layered visualization covers layers ranging from Core, IP, Radio, Optical and Microwave Transmission

DETAILED DESCRIPTION OF THE INVENTION WITH REFERENCE TO THE ACCOMPANYING FIGURES

The present invention is thus directed to system and method for monitoring multi-domain network in real time, which generates end-to-end visualization identifying the exact root cause of network element causing degradation. Further, the present invention reduces Mean Time to Repair (MTTR) in case of outage in the network.

Figure 1:
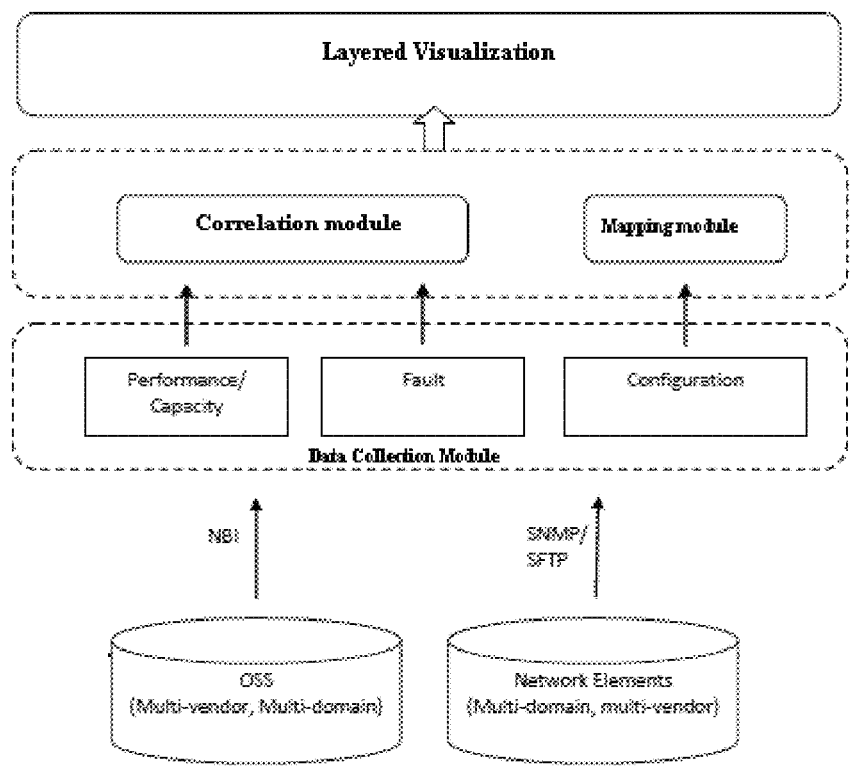
FIG. 1: illustrates block diagram of the system for monitoring multi-domain network in real time according to the present invention.

Referring to FIG. 1, a system for monitoring multi-domain network in real time using layered visualization comprises of data collection module; correlation module; mapping module; and management server. The data collection module collects performance data, alarm data and configuration logs from one or more network elements through the management server to draw connectivity across one or more layers from multiple vendors across multiple domains. The performance data includes measurements having statistical count on every action encountered in the network. The alarm data includes fault event occurrences within the network. The correlation module correlates the collected performance data, alarm data and configuration logs at regular intervals in order to isolate the root cause of the issue identified. The correlation module breaks down the faulty event occurrences based on the network behavior.

The correlation module is an inter-domain correlation module that categorizes the event occurrences based on the network behavior at each instance to the network's general functionality of the network elements to isolate the root cause of the issue identified thereby reducing Mean Time to Repair (MTTR) in case of outage in the network and also to sees its impact across other connected domains.

Reducing the MTTR is the key for effective communication in telecom networks, which is achieved by isolating the cause for network performance degradation targeting the exact team/vendor which is accountable to fix the respective degradation. The system for monitoring multi-domain network generates visualization upto the subscriber affected path thereby identifying issues upto the subscriber level parameters.

The mapping module maps the categorized performance data, alarm data and configuration logs of all the network elements which are superimposed with layered visualization, thereby identifying exact root cause of network element causing degradation in the network. The system for monitoring multi-domain network automatically generates visualization of different domains in a telecommunication network and identifies the exact root cause of network element using the layered approach based on configuration logs, performance and alarm data collected across multiple domains. The visualization includes but not limited to maps, graphs and topological view etc., which is available in varying dashboard prospects. The system visualizes the problem with layer wise connected network element status, so that end user can easily identify the root cause of the problem.

Figure 2:
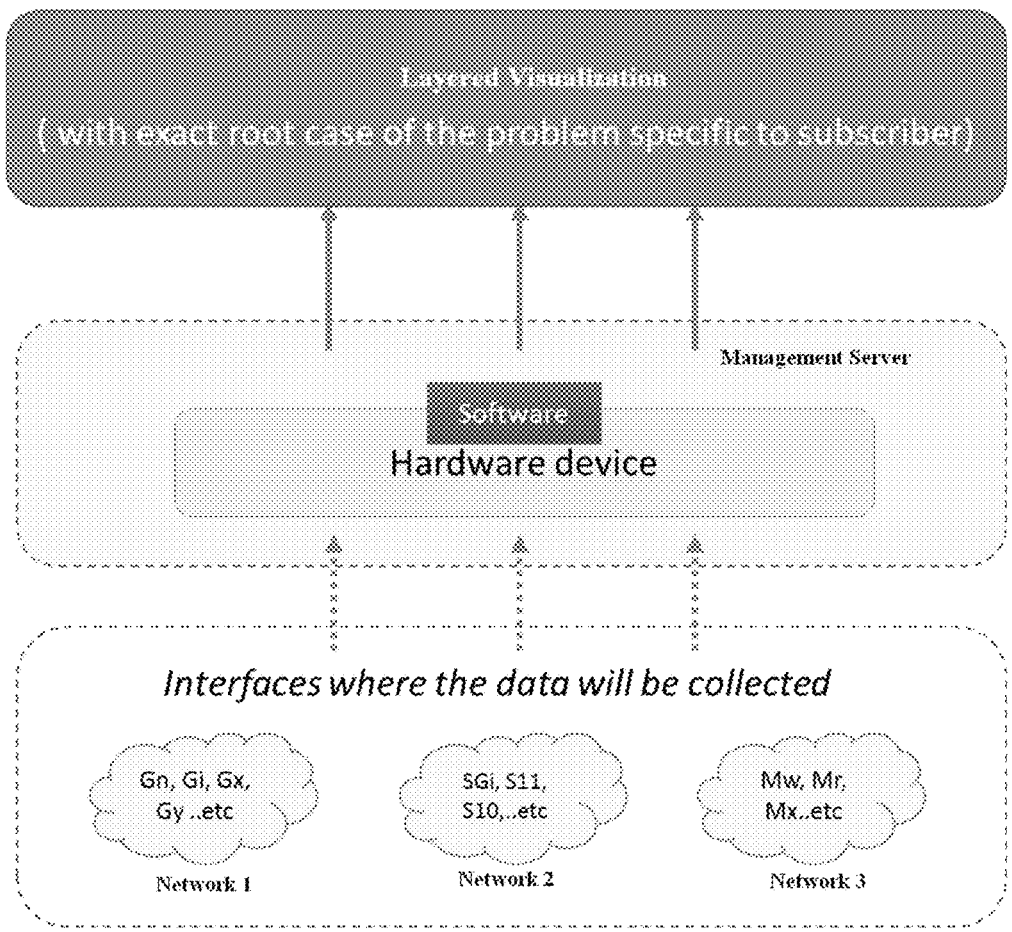
FIG. 2: illustrates the block diagram showing method for monitoring multi-domain network in real time using layered visualization according to the present invention.
Figure 3:
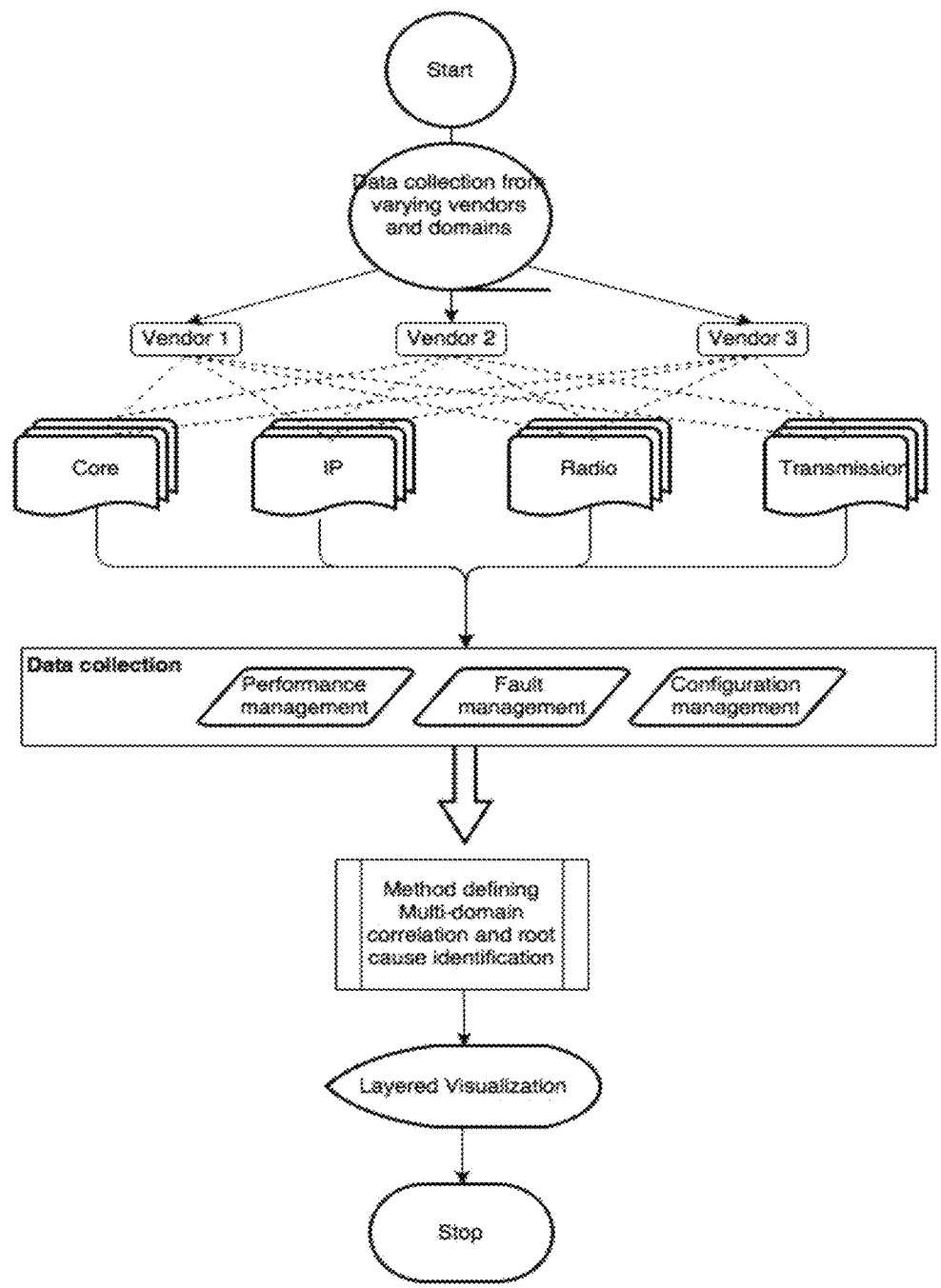
FIG. 3: illustrates the system flow model for monitoring multi-domain network in real time using layered visualization according to the present invention.
Figure 4:
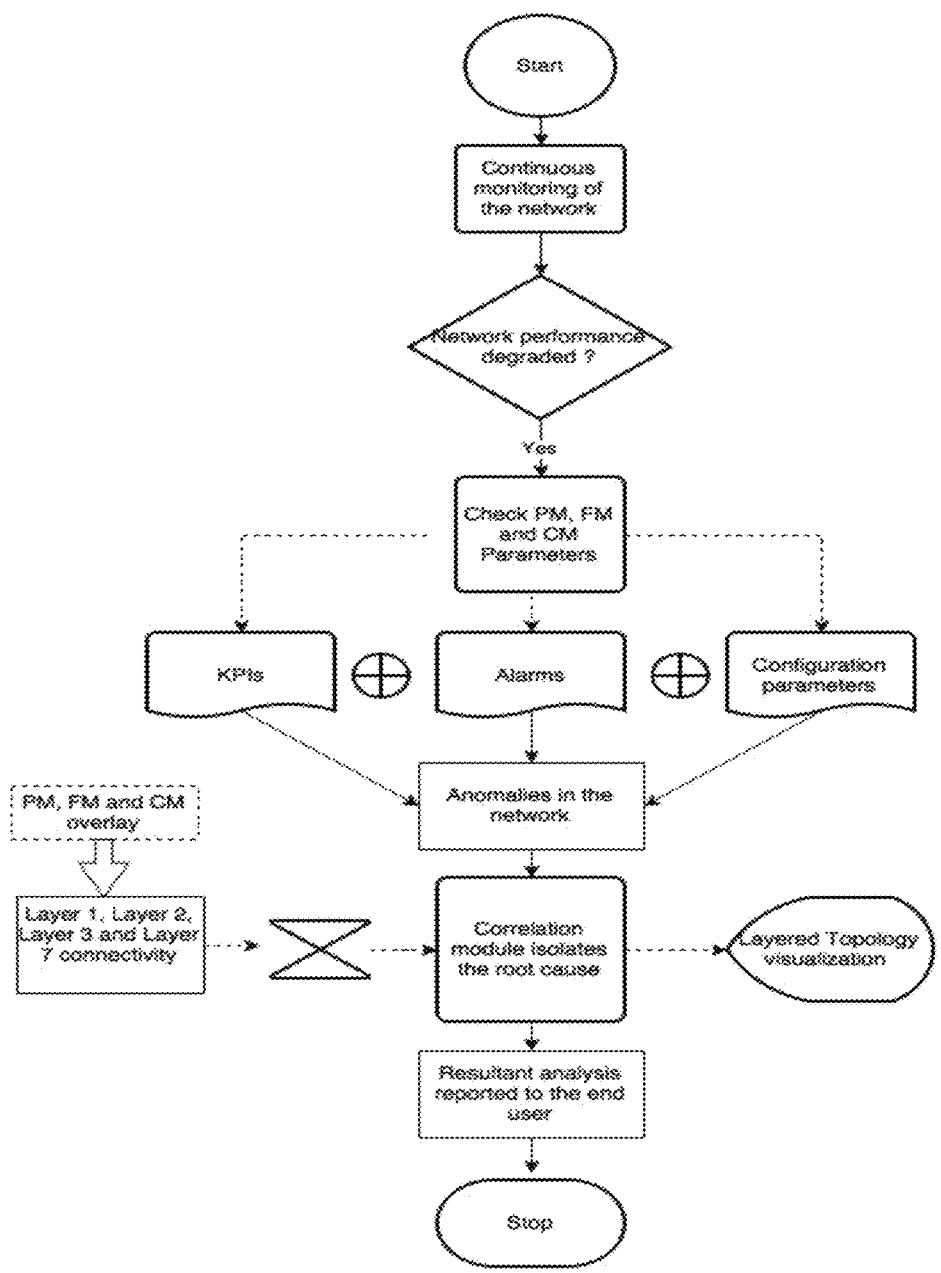
FIG. 4: illustrates the method flow for monitoring multi-domain network in real time using layered visualization according to the present invention.

FIGS. 2 to 4 illustrates method for monitoring multi-domain network in real time using layered visualization. The performance data, alarm data and configuration logs are collected in real time from the OSS and network elements using Network Management System (NMS), File Transfer Protocol (FTP), Secure Shell File Transfer Protocol (SFTP), Simple Network Management Protocol (SNMP) and Telnet to draw the connectivity across one or more layers. The performance data, alarm data and configuration logs are collected from multiple vendors across multiple domains up to the visualization module ending up with user level analysis as shown in FIG. 3. When network degradation is detected during continuous monitoring of the network data including performance, alarms and configuration, the correlation module considers the network connectivity, Performance data—Fault management—Configuration management overlay thereby providing layered visualization highlighting the root cause of the issue. The performance data includes but not limited to measurements having statistical count on every action encountered in the network.

The configuration logs collected are overlaid with the performance data and alarm data and further visualized for in-depth analysis of hardware components across various layers. The configuration management analyzes the hardware component parameters across various network elements. The performance of the hardware components will be updated in terms of counters. The performance and alarm data of the hardware components received is overlaid with the configuration to provide hardware specific visualization with the performance data and fault management overlay. The Key Performance Indicators (KPIs) of these counters will provide the performance statistics on the particular function performed by the respective network elements. The counters will be collected from various vendors of the management server to formulate the KPIs The KPI representing these performance metrics would enable in achieving correlation between alarm data and configuration data. The KPIs and configuration logs collected are correlated with the alarm data to determine the anomalies in the network as shown in FIG. 4.

The collected performance data, alarm data and configuration logs are categorized based on the network element functionalities, alarm severity and network element configuration parameters respectively on every event occurrences. The alarm severity includes critical, major, minor and warning.

The alarm data collected is scanned at regular intervals to find the differences in the result set thus having the network structure updated. Inter domain correlation of the categorized performance data, alarm data and configuration logs is used to identify exact root cause of the network element causing degradation in the network. The functionalities provided by each network element corresponding to which the correlation is defined to find the root cause. The inter domain correlation categorizes the event occurrences based on the network behavior at each instance to the network's general functionality of the network elements to isolate the root cause of the issue identified thereby reducing Mean Time to Repair (MTTR) in case of outage in the network.

The categorized performance data, alarm data and configuration logs of all the network elements which are superimposed with layered visualization being mapped thereby identifying exact root cause of network element causing degradation in the network. The method provides visualization highlighting the exact root cause of the network issue causing degradation in the network element. The method generates visualization across domains in a telecommunication network and identifies the exact root cause of network element using the layered approach based on performance data, alarm data and configuration logs collected across multiple domains. The root cause is shown in the layered visualization which is reported to the end user. The layered visualization covers all layers ranging from Core, IP, Radio, Optical and Microwave Transmission. The visualization includes but not limited to maps, graphs and topological view shown in varying dashboard prospects. The system visualizes the problem with layer wise connected network element status, so that end user can easily identify the root cause of the problem. The visualization shows the inter connectivity between the network elements in the network. Thus, when there is an abnormal event occurrence, the dependency between the networks elements are analyzed to find the root cause. The layered visualization supports in breaking down the events across each network element based on the functionality handled. Therefore for each and every event, service flow is considered to find the main network element causing the network issue. The visualization is achieved for the performance degradation observed in the network element in first layer, which impacts the connected node performance in second layer, third layer and seventh layer.

For illustration,

Use Case 1: Layered Visualization

Method for monitoring Subscriber (S1) having data browsing issue who is located in Area (A1) in a multi-domain network.

The Subscriber (S1) may have browsing issue may be due to some of the following reasons:
1) Capacity overload issue of L0 or L1 or L2 or L3 or L7 network elements of Area (A1).
2) Hardware failure in any one of inter-domain devices which carries data for the Subscriber (S1).
3) Configuration mismatch issue between different domains or same domain network elements.
4) The Subscriber (S1) itself having issue with their own mobile device or billing or subscription related issues.

Method for monitoring Subscriber (S1) having data browsing issue as said above comprising steps of: User profile is retrieved that will be overlaid on the topological connectivity in order to view the affected path. Path from the Subscriber (S1)'s Location is traced to nearest connected network element (L0/L1 device) to the Internet Service Provider (ISP). The entire network elements (L0/L1, L2, L3, and L7) involved in the path is visualized for identifying actual flow of the issue in order to gain possibilities of correlation across the layers. The network elements in layers L0 and L1 include but not limited to Microwave IDU, ODU, Fiber DWDM, MUX, and SDH. The users are provided with detailed event information occurring in every part of the network such as the influencing factors during performance degradation along with possible suggestions to resolve the issue via a customized format export such as Excel, Hypertext Markup Language (HTML), and Portable Document Format (PDF) etc. The network elements in layers L2 and L3 include but not limited to one or more switches, one or more routers and firewall. The network elements in layer L7 include but not limited to MSS, MGW, HLR, SGSN, GGSN, IMS, MME, HSS, ICSCF, PCRF, IN, DNS, RNC, BSC, and NodeB.

Use Case-2: PM, FM and CM correlation

Subscriber location information gets updated in a centralized server also known as Home location register in regular intervals. When this fails, the Subscriber will not be able to receive signal when he locates from one area to another. This says that location update must happen at a maximum success rate. Apart from the success rates being deviated, failure rates can also be analyzed in finding the reason for performance degradation. Hence a KPI defined as location update success rate will give statistical data on that information. Any deviation can be assumed to be performance degradation in a network element.

The location update failure can be due to many reasons including the network element failed in receiving the signal etc., triggering the "Link Failure Alarms between HLR and MSS" meaning that HLR failed in identifying the signal along which the alarms occurred during the period is analyzed. The alarms are categorized into critical, major, minor and warning based on the severity to find problems in the network. The alarm is correlated with the performance data to identify degradation in the network with its associated alarm cause in forms like entire topological view and Graphs. The location based parameters will be checked on date and node wise to identify the configuration changes or any abnormal events which then will be escalated to teams on its acknowledgement. When the location update failure was due to the illegal devices logging in, then the device information can be correlated with the FM in order to find the root cause. The functionalities provided by each network element corresponding to which the correlation would be defined to find the root cause.

If alarm notified is due to the network fault, then the network element HLR must be monitored. The HLR related performance statistics like whether it handles the response depends initially on the HLR being in an activated state and its utilization. When the utilization reached its limit, the capacity limit must be redefined or the required resources must be allocated to be handled by another network element. Current state of the network element capacity limits can be viewed via the Hardware structure of network element overlaid with its performance metrics. The configured nature of the network element when initially deployed will be stored in the form of data which will be monitored when finding the answers to the network issues. Current state of the network elements are monitored using timers in respective network element. Timer based analysis is done considering the subscriber behavior so that suggestions would be made either to increase or decrease the timer parameter capturing the request/response signals. For any event occurred across the network, the timely related data are correlated to define the flow of the service. The layered visualization supports in breaking down the events across each network element based on the functionality handled.

Therefore for each and every event, service flow will be considered to find the main network element causing the network issue shown better in topology view.

Abbreviations

IDU—Indoor Unit
ODU—Outdoor Unit
DWDM—Dense Wavelength Division Multiplexing
DNS—Domain Name System
MUX—Multiplexer
SDH—Synchronous Digital Hierarchy
MSS—Mobile Satellite Services
PGW—Packet Data Network Gateway
SGW—Serving Gateway
MGW—Media Gateways
HLR—Home Location Register
SGSN—Serving General Packet Radio Service (GPRS) Node
GGSN—Gateway GPRS Node
IMS—Internet Protocol Multimedia Subsystem
MME—Mobility Management Entity
HSS—Home Subscriber Server
ICSCF—Interrogating Call State Control Function
IN—Intelligent Network
PCRF—Policy and Charging Rules Function
BSC—Base Station Controller
RNC—Radio Network Controller
eNodeB—enhanced NodeB
NMS—Network Management System
FTP—File Transfer Protocol
SFTP—Simple File Transfer Protocol
SNMP—Simple Network Management Protocol

I claim:

1. A system for monitoring multi-domain network in real time using layered visualization comprising of:
   a management server;
   a data collection module configured to collect performance data, alarm data, configuration logs and signalling traces from one or more network elements through the management server to draw connectivity across one or more layers;
   a correlation module configured to correlate the collected performance data, alarm data and configuration logs at regular intervals in order to isolate the root cause of the issue identified; and
   a mapping module configured to map the performance data, alarm data and configuration logs of all the network elements which are superimposed with layered visualization;
   wherein the performance data, alarm data and configuration logs of all the network elements are superimposed with layered visualization and mapped by the mapping module and thereby identify exact root cause of network element causing degradation in the network performance.

2. The system as claimed in claim 1, wherein the correlation module categorizes the event occurrences based on the network behavior at each instance to the network's general functionality of the network elements to isolate the root cause of the issue identified thereby reducing Mean Time to Repair (MTTR) in case of outage in the network.

3. A method for monitoring multi-domain network in real time comprising steps of:
   collecting performance data, alarm data and configuration logs from network elements to draw connectivity across one or more layers;
   categorizing the collected performance data, alarm data and configuration logs based on the network element functionalities, alarm severity and network element configuration parameters respectively on every event occurrences; and
   mapping the categorized performance data, alarm data and configuration logs of all the network elements which are superimposed with layered visualization, thereby identifying exact root cause of network element causing degradation in the network,
   wherein the alarm data collected is scanned at regular intervals to find the differences in the result thus updating the structure of the network,
   wherein inter domain correlation of the performance data, alarm data, and configuration logs is used to identify exact root cause of the network element causing degradation in the network performance, and
   wherein the inter domain correlation categorizes the event occurrences based on the network behavior at each instance to the network's general functionality of the network elements to isolate the root cause of the issue identified thereby reducing Mean Time to Repair (MTTR) in case of outage in the network.

4. The method as claimed in claim 3, wherein the configuration logs collected analyzes hardware components across various network elements.

5. The method as claimed in claim 3, wherein the performance data includes measurements having statistical count on every action encountered in the network.

6. The method as claimed in claim 3, wherein the alarm data includes fault event occurrences within the network.

7. The method as claimed in claim 3, wherein the performance data, alarm data and configuration logs are collected in real time from the OSS and network elements using Network Management System (NMS), File Transfer Protocol (FTP), Secure Shell File Transfer Protocol (SFTP), Simple Network Management Protocol (SNMP) and Telnet.

8. The method as claimed in claim 3, wherein the visualization is achieved for the performance degradation observed in the network element in first layer, which impacts the connected node performance in second layer, third layer and seventh layer.

9. The method as claimed in claim 3, wherein the layered visualization covers layers ranging from Core, IP, Radio, Optical and Microwave Transmission.

* * * * *